United States Patent Office 3,382,033
Patented May 7, 1968

3,382,033
METHOD OF REMOVING NITRIC OXIDE FROM GASES
Tetsuzo Kitagawa, Tokyo, Japan, assignor to Kobe Steel Works, Ltd., Fukiai-ku, Kobe, Japan
No Drawing. Filed Feb. 17, 1964, Ser. No. 345,101
Claims priority, application Japan, Feb. 20, 1963, 38/8,948
4 Claims. (Cl. 23—2)

ABSTRACT OF THE DISCLOSURE

Process of removing nitric oxide from gases comprising contacting said gas with a porous carrier impregnated with a member selected from the group consisting of $FeSO_4$, $FeSO_4+H_2SO_4$, $FeSO_4\cdot(NH_4)_2SO_4$, $PdSO_4$, $KMnO_4$, $KMnO_4+H_2SO_4$, $KClO_3$, $NaClO+NaOH$, $$NaClO_2+NaOH$$

$Na_2MoO_4$, $K_2S_2O_3$, $Na_2S_2O_3+NaOH$, $NaHPO_4$, $Na_2O_2$, $As_2O_2+NaOH$, $CuCl_2$ and $ICl_3+NaOH$.

---

This invention relates to a novel method which has for its object the removing of nitrogen oxides, particularly nitric oxide or nitrogen dioxide, almost completely or completely from gases such as industrial gases or air containing said nitrogen oxides. The gist of this invention lies in the point that chemical substances which absorb the nitrogen oxides contained in gases or such chemical substances as react with the nitrogen oxides to form reaction products in an easily removable form (these chemical substances are hereinafter collectively referred to as the removing agents) are adsorbed independently or jointly with other assistants in the surface of porous carrier particles to make a filler layer, into which the object gas to be treated is passed and thereby the nitrogen oxides contained therein are removed in a dry state.

Description of the preferred embodiments.

The removing agents used in this invention are the inorganic salts of hydroxy acid such as $FeSO_4$, $PdSO_4$, $KMnO_4$, $KClO_3$, $NaClO$, $NaClO_2$, $Na_2MoO_4$, $K_2S_2O_3$, $Na_2S_2O_3$ and $Na_2HPO_4$, or inorganic oxides such as $Na_2O_2$, $As_2O_3$ and $PbO_2$, or halides such as $KI$, $CuCl_2$ and $ICl_3$. In using these chemical substances as the removing agents, there are cases where, in addition to the use of one kind independently, it is possible to use two or more kinds jointly, or to use one or more removing agents jointly with an alkali such as caustic alkali or sulfuric acid or with an assistant such as acid. When these removing agents are used by being adsorbed in porous carrier particles such as alumina gel or silica gel or active bodies of these, their effectiveness in removing the nitrogen oxides from the gases appears almost equal within a certain range. According to tests, a removal rate of from 80% to 100% has been obtained.

To use the removing agents by adsorbing them in the surface of a carrier and thereafter drying the same is one of the characteristic features of this invention, and, when the gas to be treated is passed into said carrier with the removing agents adsorbed therein, extremely effective removal of the nitrogen oxides is carried out even at around normal temperature and at normal pressure.

The effectiveness in removing nitrogen oxides according to the method of this invention is given below.

A carrier with globular active alumina of 4–6 meshes used thereon was dried under vacuum for 2 hours at 90° C. in advance. A 5% aqueous solution of each of the above-mentioned removing agents was adsorbed in an amount of 50 ml. to 100 g. of said carried alumina, which was then dried under vacuum at 80–90° C. and thereafter packed in a tube, followed by the passing of nitrogen oxide-containing gas (in the test, nitrogen was used) into said tube at a velocity of 50 l. per hour, and, after one hour from the time the gas began to be passed, the NO concentration of the gas passed was measured to obtain the following data.

| Removing Agents | NO Concentration (p.p.m.) Inlet Side | NO Concentration (p.p.m.) Outlet Side | Rate of Removal of NO (percent) |
|---|---|---|---|
| $FeSO_4$ | 0.446 | 0.0156 | 96.5 |
| $FeSO_4+H_2SO_4$ | 0.195 | 0.038 | 80.6 |
| $FeSO_4\cdot(NH_4)_2SO_4$ | 0.158 | 0.005 | 96.84 |
| $PdSO_4$ | 3.33 | 0.73 | 84.1 |
| $KMnO_4$ | 0.26 | 0.038 | 85.4 |
| $KMnO_4+H_2SO_4$ | 0.207 | 0.023 | 88.2 |
| $KClO_3$ | 0.310 | 0.035 | 88.7 |
| $NaClO+NaOH$ | 4.10 | 0.253 | 93.8 |
| $NaClO_2+NaOH$ | 0.300 | 0.01 | 96.6 |
| $Na_2MoO_4$ | 0.205 | 0.0235 | 88.3 |
| $K_2S_2O_3$ | 0.564 | 0.012 | 97.88 |
| $Na_2S_2O_3+NaOH$ | 2.34 | 0.0725 | 97.5 |
| $Na_2HPO_4$ | 0.247 | 0.04 | 83.8 |
| $Na_2O_2$ | 0.456 | 0 | 100 |
| $As_2O_2+NaOH$ | 0.486 | 0.047 | 90.4 |
| $CuCl_2$ | 3.29 | 0 | 100 |
| $ICl_3+NaOH$ | 4.6 | 0.57 | 87.8 |

Methods hitherto adopted for removal of the nitric oxide or nitrogen dioxide from industrial gases include, the catalytic removing method which removes said nitrogen oxides by reducing them with the hydrogen in industrial gases and by using a catalyst at high temperature and high pressure (for example, Patent Publication No. 3959/1959) and the wet-type removing method in which said industrial gases are washed with a solution in which various kinds of salts and other compounds have been dissolved (for example, Patent Publication No. 10134/1960, the same No. 15259/1961). However, since these methods require high temperature or high pressure or are of the wet-type, their operation is often subject to defects in equipment and, therefore, they are not always advantageous in industry.

In contrast to the foregoing, the method of this invention is a so-called dry method using a porous carrier with the above-mentioned removing agents adsorbed therein and dried as a filler layer. The gas to be treated is merely passed through said filler layer to remove the nitrogen oxides contained in said gas. Further, since this method removes the nitrogen oxides with high efficiency, and because the reaction or absorption for removing the nitrogen oxides progresses very quickly at normal temperature and normal pressure, it is unnecessary to make special adjustment in respect of the temperature and pressure. Therefore, the method of this invention is very advantageous in treating the nitrogen oxide-containing gases in various types of processes.

As the removing agents used in this invention, mention was made herein above of the hydroxy acid salts, metal oxides and halides, but, of them, the most effective removing agents are $FeSO_4$, $Na_2O_2$ and $NaClO_2$. The results obtained by carrying out flow treatment for a long time further in respect of said three are as follows.

| Removing Agents | Flow Time (hr.) | Flow Rate (l.) | NO Concentration (p.p.m.) Inlet Side | NO Concentration (p.p.m.) Outlet Side | Rate of Removal of NO (percent) |
|---|---|---|---|---|---|
| FeSO₄ | 1.5 | 42.7 | 0.56 | 0 | 100 |
|  | 3.0 | 76.1 | 0.65 | 0 | 100 |
|  | 5.5 | 145.2 | 0.55 | 0 | 100 |
|  | 11.25 | 296.9 | 3.22 | 0 | 100 |
|  | 13.25 | 340.0 | 2.96 | 0 | 100 |
|  | 20.00 | 1,006.0 | 4.6 | 0.22 | 95.2 |
| Na₂O₂ (NaOH) | 3.0 | 156.1 | 3.85 | 0 | 100 |
|  | 4.5 | 225.0 | 5.15 | 0.074 | 98.6 |
|  | 7.0 | 350.0 | 4.42 | 0.461 | 89.2 |
|  | 8.5 | 419.6 | 4.14 | 0.336 | 91.9 |
|  | 10.0 | 500.0 | 4.34 | 0.512 | 88.2 |
|  | 12.0 | 620.0 | 4.30 | 1.08 | 74.9 |
| NaClO₂ (NaOH) | 7.0 | 349.1 | 3.64 | 0 | 100 |
|  | 13.0 | 612.2 | 3.46 | 0 | 100 |
|  | 24.0 | 1,192.2 | 4.4 | 0 | 100 |
|  | 35.0 | 1,747.4 | 4.12 | 0 | 100 |
|  | 43.0 | 2,188.2 | 3.5 | 0 | 100 |
|  | 51.0 | 2,623.5 | 3.8 | 0 | 100 |
|  | 56.0 | 2,858.5 | 3.96 | 0 | 100 |
|  | 62.0 | 3,154.6 | 3.38 | 0 | 100 |
|  | 66.0 | 3,367.7 | 4.27 | 0 | 100 |
|  | 72.0 | 3,592.9 | 2.78 | 0 | 100 |
|  | 75.0 | 3,736.6 | 4.5 | 0 | 100 |
|  | 84.0 | 4,177.9 | 4.61 | 0 | 100 |
|  | 104.0 | 5,097.3 | 3.1 | 0 | 100 |

Further, it was confirmed that the use of a mixture of chlorous acid salt and alkali (for example, NaCl₂ to one part of which 4 parts, 2 parts and 0.4 part of NaOH have been added) is extremely effective.

Summed up, the method of this invention for removing the nitrogen oxides from gases is a method extremely advantageous for industry, since the rate of removal is very high, complete removal not being impracticable, the volume removed is large, the method can be used effectively event at high temperature and either normal or high pressure, the method is a dry method so that the removing process and apparatus are simple, and, accordingly, it is capable of economically removing the nitric oxide or nitrogen dioxide by simple operation.

What is claimed is:

1. A process for removing nitric oxide from gases comprising the following steps:
   (1) drying under vacuum an inert porous carrier capable of adsorbing a removing agent in small particles;
   (2) preparing a solution of at least one removing agent capable of reacting with nitric oxide selected from the group consisting of PdSO₄, KMnO₄, $$KMnO_4 + H_2SO_4$$

and NaClO₂+NaHOH;

(3) adsorbing said removing agent in said carrier;
   (4) drying the carrier with said removing agent adsorbed therein;
   (5) passing the nitric oxide containing gas to be cleaned through said carrier.

2. A process for removing nitric oxide from gases as claimed in claim 1, said carrier comprising porous alumina gel.

3. A process for removing nitric oxide from gases as claimed in claim 1, said carrier comprising porous silica gel.

4. A process for removing nitric oxide from gases as claimed in claim 1, said carrier comprising porous active bodies of alumina and silica.

References Cited
UNITED STATES PATENTS

| | | | |
|---|---|---|---|
| 948,726 | 2/1910 | Halvorsen | 23—161 |
| 1,765,254 | 6/1930 | Wyler | 23—2 X |
| 2,315,988 | 4/1943 | Somers et al. | 23—161 X |
| 3,023,076 | 2/1962 | Karwat | 23—2 |
| 3,050,363 | 8/1962 | Veal | 23—2 X |
| 3,149,907 | 9/1964 | Karwat | 23—2 |

EARL C. THOMAS, *Primary Examiner.*